United States Patent [19]

Berg, Jr. et al.

[11] 4,061,873
[45] Dec. 6, 1977

[54] CORNER INSULATOR FOR ELECTRIC FENCES

[76] Inventors: Albert T. Berg, Jr.; Howard Langlie, both of Ellendale, Minn. 56026

[21] Appl. No.: 709,860

[22] Filed: July 29, 1976

[51] Int. Cl.² .................... H01B 17/24; A01K 3/00
[52] U.S. Cl. .................................. 174/208; 24/237; 24/255 SL; 174/158 F
[58] Field of Search ............ 174/158 F, 161 F, 163 F, 174/208; 256/10; D26/10; 24/201 HE, 201 HL, 230.5 R, 230.5 S, 230.5 CS, 230.5 TH, 231, 241 S, 241 SP, 236, 237, 248 SL, 249 SL, 255 SL, 265 SH; 248/74 PB; 59/82, 89, 90, DIG. 1

[56] References Cited

U.S. PATENT DOCUMENTS

| | | | |
|---|---|---|---|
| 3,090,826 | 5/1963 | Cochran | 248/74 PB X |
| 3,515,363 | 6/1970 | Fisher | 248/74 PB X |
| 3,991,960 | 11/1976 | Tanaka | 24/248 SL X |

OTHER PUBLICATIONS

Red Snap'r Electric Fence Insulators Catalog, published by North Central Plastics, Inc., Ellendale, Minnesota, pp. 1 and 2 relied on, received in PTO on July 23, 1971.

*Primary Examiner*—Laramie E. Askin
*Attorney, Agent, or Firm*—Stuart R. Peterson

[57] ABSTRACT

A one-piece corner post insulator of high density polyethylene for electric fences includes a relatively rigid U-shaped body having a spring arm extending from the end of one leg of the body towards the end of the other leg thereof. The spring arm has a hooked end releasably engageable with a keeper formed on the said other leg. An appropriately located hole in the rigid body permits one end of an anchor wire to be threaded therethrough and the other end looped over the corner fence post. The electric fence wire can be pressed between the hooked end and the said other leg into the opening formed by the spring arm and rigid body, and then the hooked end snapped into engagement with the keeper so that the electric fence wire is held captive.

6 Claims, 6 Drawing Figures

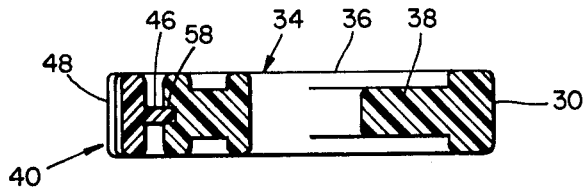
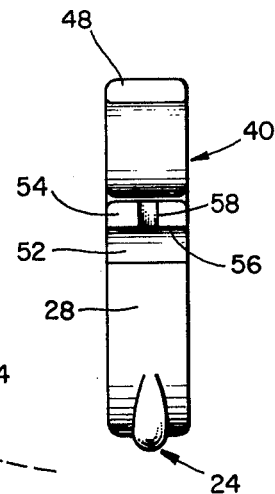
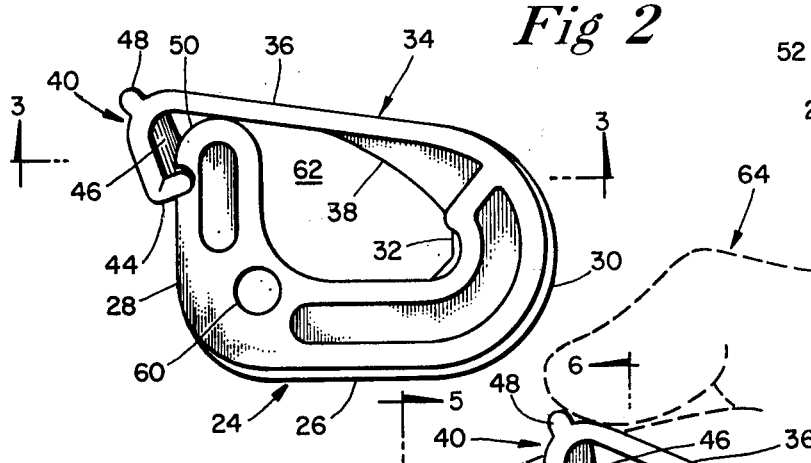
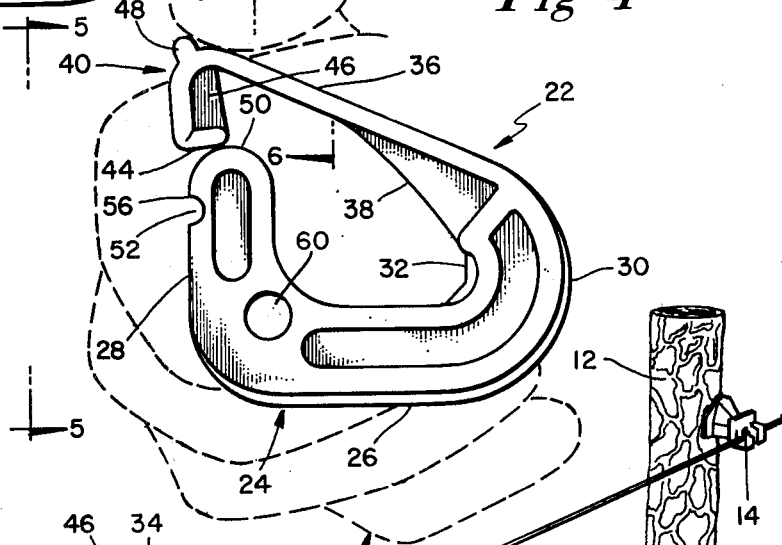
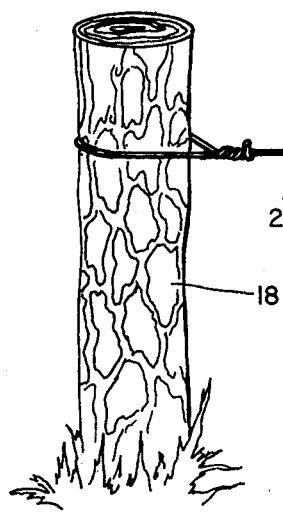

CORNER INSULATOR FOR ELECTRIC FENCES

BACKGROUND OF THE INVENTION

1. Field of the Invention

This invention relates generally to electric fence insulators, and pertains more particularly to an insulator for attachment to a corner post.

2. Description of the Prior Art

Corner post insulators for electric fences are, of course, not new. One extensively used corner post insulator employs a generally rectangular frame providing a relatively small entrance near one end via which the electric fence wire is inserted into the center of the frame. The entrance, when the insulator is in use, is closed by an oblong metal loop that is pivotally connected at one end to the plastic insulator adjacent one side of the entrance and releasably latched at its other end to the plastic insulator adjacent the other side of the entrance. While the metal loop effectively closes the entrance, being metal and therefore electrically conductive, it reduces appreciably the arcing distance between the electric fence wire and the wire attaching the insulator to the corner fence post.

Another type of corner insulator with which we are familiar is a plural-grooved knob, the electric fence wire lying in one groove and the anchor wire in another groove extending perpendicularly to the first groove. The insulator, in this instance, is placed under compression rather than under tension as in the prior art insulator mentioned above. Here again, however, the arcing distance is relatively short, due to the proximity of the fence wire to the anchor wire, a situation which encourages arcing from the fence wire to that portion of the anchor wire nearest thereto.

SUMMARY OF THE INVENTION

Accordingly, an important object of the present invention is to provide a corner post insulator for electric fences that will assure a relatively long arcing distance. More specifically, an aim of the invention is to hold the electric fence wire at an appreciable distance from the anchor wire for a given size insulator, virtually the entire length of the insulator being made use of in providing a highly effective arc gap.

Another object of the invention is to provide an all-plastic insulator devoid of any metal between the electric fence wire and the anchor wire, which would lessen the overall arcing distance between the electric fence wire and the anchor wire. Also, the invention has for an aim an insulator, lacking any metal, that will not rust. Thus, in addition to maintaining an effectively long arc gap, an insulator fabricated in accordance with the teachings of our invention will last indefinitely without deterioration.

A further object is to provide a corner post insulator that can be easily and quickly installed without tools or implements.

Still further, an object of the invention is to provide a corner post insulator of the foregoing character that permits the electric fence wire to be applied to the insulator after the insulator is attached to the corner post.

Another object of the invention is to provide a corner post insulator that resists any inadvertent release of the fence wire, yet allowing the insulator to be readily pried open when it is desired to remove the electric fence wire from the insulator.

Another object is to provide a tough and durable corner post insulator which can withstand the relatively large loads to which an insulator of this type is subjected by reason of it being located at a corner. In this regard, most electric fence insulators are only required to elevate the electric fence wire and hold the wire in a straight line, whereas a corner post insulator must change the wire's direction, usually at a right angle, so that the wire in this instance exerts a far greater pull or load on the insulator than where the electric fence wire is merely held at a desired height.

The invention also has as an object the provision of an electric fence insulator for corner posts that can be readily and inexpensively molded in one piece, thereby obviating any time-consuming assembly of individual parts, as required with one of the prior art insulators hereinbefore alluded to.

Briefly, our invention contemplates a one-piece corner post insulator of high density polyethylene which contains no metal parts. The insulator comprises a generally U-shaped rigid body composed of a substantially straight shank and two legs. A spring arm, also of polyethylene, is integral with one leg and extends toward the other leg, the spring arm having a hooked end which is engageable with a keeper formed on the second leg. Actually, the hooked end has a pair of inwardly directed jaw elements thereon and the keeper constitutes a pair of dog elements formed by a transverse groove on the second leg. The second leg is rounded so that the jaw elements are first cammed outwardly and then snap into the transverse groove to latch the spring arm closed. A web associated with the two jaw elements is received in a slot between the two dog elements to prevent the hooked end of the spring arm from shifting laterally when the spring arm is latched. A thumb lug on the spring arm facilitates the latching by the user. The leg to which the spring arm is connected has a notch of fairly small radius into which the fence wire moves during use. A hole through the U-shaped body remote from the notch permits the anchor wire to be threaded therethrough at one end and attached at its other end to the fence post. Consequently, a relatively long arcing distance between the fence wire and anchor wire is assured when following the teachings of our invention.

BRIEF DESCRIPTION OF THE DRAWING

FIG. 1 is a perspective view showing our corner post insulator in actual use;

FIG. 2 is an enlarged side elevational view of the insulator with the insulator in the latched condition of FIG. 1;

FIG. 3 is a sectional view taken in the direction of line 3—3 of FIG. 2;

FIG. 4 is a side elevational view corresponding to FIG. 2 but with the insulator not yet latched, a person's hand having been superimposed thereon in a phantom outline for the purpose of illustrating how the latching is achieved;

FIG. 5 is an end view taken in the direction of line 5—5 of FIG. 4, and

FIG. 6 is a sectional detail taken in the direction of line 6—6 of FIG. 4.

DESCRIPTION OF THE PREFERRED EMBODIMENT

Referring first to FIG. 1 of the drawings, a section of a typical electric fence has been denoted generally by the reference numeral 10. Included in the fence 10 is a wooden post 12 having an electric fence insulator 14 attached thereto. The insulator 14 can be of various constructions, and, not being a corner post insulator, plays no role in the practicing of our invention. Further included in the fence 10 is an electric fence wire 16. The electric fence 10 additionally includes a corner wooden post 18 having an anchor wire 20 engaged therewith.

Describing now our corner post insulator, the insulator exemplifying our invention has been indicated generally by the reference numeral 22. It can be explained at the outset that the insulator 22 is of one-piece construction, being completely of plastic and more specifically of high density polyethylene. The corner post insulator 22 comprises a rigid U-shaped body 24 which includes an elongated shank 26 and a pair of legs 28 and 30. The leg 30 is curved, having a fairly short radius notch at 32 for the accommodation of the fence wire 16 during use.

Extending in a cantilever fashion from the free end of the leg 30 is a spring arm 34 which includes a resilient shank 36. Actually, the shank 36 is relatively rigid where it connects with the leg 30 by there being an underlying gusset or reinforcing portion 38. Consequently, the spring arm 34 is relatively rigid adjacent its juncture with the leg 30 but is resilient by reason of the relatively thin shank 36 which has a lesser cross section than the cross section of any portion of the body 24.

Continuing with the description of the spring arm 34, it is to be observed that it has a hook end at 40. More specifically, the hook end 40 is composed of a pair of inwardly directed jaw elements 42 and 44 having a web 46 for a purpose soon to be made manifest, the web extending upwardly from the adjacent ends of the jaw elements 42, 44 to the underside of the shank 36. Also, it will be discerned that a thumb lug 48 is formed integrally with the spring arm 34 being located adjacent the hook end 40.

At this time attention is called to the special configuration of the leg 28 which functions as a keeper 49 for the hook end 40. It will be seen that the free end of the leg 28 is rounded at 50. Extending across the leg 28 adjacent the rounded end 50 is a transverse groove 52 which forms a pair of dogs 54 and 56, the ends of which are separated slightly by a slot at 58.

Where the leg 28 is joined to the rigid shank 26 of the U-shaped body 24 there is a hole 60 through which the anchor wire 20 is threaded. The other end of the anchor wire 20 is looped over the corner post 18, as can be seen in FIG. 1.

Having presented the foregoing description, the manner in which our corner post insulator 22 is used should be readily understood. However, in order to appreciate fully the benefits to be gained by employing a corner post insulator constructed in accordance with the teachings of our invention, a brief description of the manner in which it is installed will be presented. Assuming that the electric fence wire 16 has been engaged with the insulator 14 on the post 12, then the farmer or rancher will attach the anchor wire 20 to the corner post 18. This can be done by forming a loop that is simply placed over the upper end of the corner post 18. Then, he inserts the anchor wire 20 through the hole 60 in the U-shaped body 24.

The insulator 22 is now in readiness for receiving the electric fence wire 16. As can be understood from FIG. 4, when the hook end 40 is unlatched from the keeper 49, that is, the jaw elements 42, 44 disengaged from the dog elements 54, 56, the electric fence wire can be easily inserted into the opening 62 formed by the U-shaped body and the spring arm 34. Due to the resiliency of the spring arm 34, it will normally bear against the rounded end 50 on the leg 28. A slight pressure from the fence wire 16, however, will flex the hook end 40 of the spring arm 34 away from the rounded end 50 to permit the electric fence wire to pass into the opening 62 defined by the body 24 and arm 34. After being received in the opening 62, it can be seen from FIG. 1 that the electric fence wire 16 is received in the curved notch 32.

With the electric fence wire engaging the leg 30, more specifically the curved notch 32 formed on this leg where it is integrally connected to the rigid shank 26, the hook end 40 on the spring arm 34 is ready to be latched into engagement with the keeper 49 on the leg 28. All that the farmer or rancher need do is to grasp the insulator 22 in the fashion appearing in FIG. 4. More specifically, he places his hand 64, shown in phantom outline, so that his thumb engages the lug 48. He then firmly presses the hook end 40 of the spring arm 34 downwardly so that the jaw elements 42 and 44 cam against the rounded end 50 of the leg 28. Owing to the resiliency of the shank 36, the pressure being applied by the farmer or rancher causes the jaw elements 42, 44 to bear forcibly against the rounded end 50 with the consequence that the shank 36 flexes sufficiently to permit the jaw elements 42, 44 to enter into the transverse groove 52. Once received in the groove 52, the jaw elements 42, 44 cannot be unlatched or dislodged readily from their engagement with the dog elements 54, 56 and the spring arm 34 is retained in a latched condition so that there is no likelihood of the electric fence wire 16 becoming detached from the insulator 22.

Close inspection of FIG. 3 will indicate that once the hooked end 40 has been engaged with the leg 28, as explained above, the web 46, which engages in the slot 58, prevents any lateral shifting to either side, thereby further assuring retention of the wire 16. Consequently, even if relatively large deflective forces are applied to the insulator 22, the spring arm 34 cannot be deflected to either side which would permit the electric fence wire to become detached.

As perhaps best appreciated from FIG. 2, should the farmer or rancher wish to remove the electric fence wire 16, all that need be done is to insert a suitable implement, such as a screwdriver, between the rounded end 50 and the underside of the resilient shank 36, and then pry the shank 36 in a direction away from the leg 28. A sufficient amount of prying force will cause the jaw elements 42, 44 to ride out of the transverse groove 52 past the dog elements 54, 56. This causes the insulator 22 to assume once again the condition in which it appears in FIG. 4. The electric fence wire 16 can then be slid between the rounded end 50 of the leg 28 and the jaw elements 42, 44 so that the wire 16 is completely removed from the insulator 22.

Although dimensions are not critical to a practicing of our invention, nonetheless it should be appreciated that the greatest possible distance is maintained between the electric fence wire 16 and the anchor wire 20. Also, it will be recognized that no metal parts exist between the electric fence wire 16 and anchor wire 20. Consequently, the insulator 22 can be less than two inches when measured from the leg 30 to the hook end 40. While the distance between the electric fence wire 16 and the anchor wire 20 is somewhat less than the overall length of the insulator 22, nonetheless the distance is quite appreciable and is more than adequate for the voltages normally used to energize present-day electric fences.

We claim:

1. A plastic corner post insulator for electric fences comprising a generally U-shaped body which includes first and second rigid legs and a rigid shank connected to one end of each leg and extending therebetween, and a spring arm connected at one end to the other end of said first leg and extending toward and beyond the other or free end of said second leg, said second leg having a transverse groove located on the side thereof remote from said first leg and spaced from said other or free end of said second leg, said spring arm having a hook at its other or free end including a jaw element offset from said spring arm and engageable in said transverse groove to maintain said hook in a latched condition, whereby a length of electric fence wire can be retained within the opening formed by said U-shaped body and spring arm when said jaw element is engaged in said transverse groove.

2. A corner post insulator in accordance with claim 1 in which the other or free end of said second leg is rounded so that the jaw element of said hook cams thereagainst when latching the jaw element of said hook in said transverse groove.

3. A corner post insulator in accordance with claim 2 in which said hook includes a second jaw element and a web extending between the adjacent ends of said jaw elements and the underside of said spring arm, and in which said second leg includes a slot, said slot receiving said web therein to prevent lateral shifting of said jaw elements and hence lateral shifting of the hook of said spring arm.

4. A corner post insulator in accordance with claim 3 including a lug formed on said spring arm adjacent its said hook end for facilitating manual flexing of said spring arm to effect engagement of said jaw elements in said transverse groove.

5. A corner post insulator in accordance with claim 4 in which said spring arm includes a resilient shank having a cross section less than that of said U-shaped body and a triangularly shaped gusset integral with said resilient shank and said first leg.

6. A corner post insulator in accordance with claim 5 in which said first leg has a curved notch for receiving therein the electric fence wire and in which said U-shaped body has a hole extending therethrough at a location where said rigid second leg is joined to said rigid shank for the accommodation of an anchor wire.

* * * * *